United States Patent [19]
Robertson

[11] Patent Number: 5,487,571
[45] Date of Patent: Jan. 30, 1996

[54] PIPE FITTING

[76] Inventor: Duane D. Robertson, 122 Loveland Way, Golden, Colo. 80401

[21] Appl. No.: 298,029
[22] Filed: Aug. 29, 1994
[51] Int. Cl.⁶ ..................................................... F16L 33/20
[52] U.S. Cl. ........................... 285/259; 285/256; 285/239
[58] Field of Search ..................................... 285/259, 238, 285/239, 240, 256

[56] References Cited

U.S. PATENT DOCUMENTS

| | | | |
|---|---|---|---|
| 216,851 | 6/1879 | Hofmann . | |
| 531,578 | 12/1894 | Van Dyke | 285/259 X |
| 567,962 | 9/1896 | Cooper | 285/259 X |
| 589,216 | 8/1897 | McKee . | |
| 884,461 | 4/1908 | Browne . | |
| 1,994,784 | 3/1935 | Porzel | 285/76 |
| 2,066,473 | 1/1937 | Jorgensen | 285/259 X |
| 2,371,971 | 3/1945 | Main et al. | 285/84 |
| 2,805,088 | 9/1957 | Cline et al. | 285/239 |
| 2,937,892 | 5/1960 | Prescott, Jr. | 285/259 X |
| 3,243,208 | 3/1966 | Lalikos et al. | 285/256 |
| 3,817,561 | 6/1974 | Kay | 285/177 |
| 3,980,325 | 9/1976 | Robertson | 285/249 |
| 4,603,890 | 8/1986 | Huppee | 285/239 |
| 4,607,867 | 8/1986 | Jansen | 285/259 X |
| 4,712,809 | 12/1987 | Legris | 285/21 |
| 5,165,733 | 11/1992 | Sampson | 285/259 X |

FOREIGN PATENT DOCUMENTS

| | | | |
|---|---|---|---|
| 810096 | 3/1937 | France | 285/239 |
| 3817442 | 11/1989 | Germany . | |
| 2263956 | 8/1993 | United Kingdom | 285/239 |

*Primary Examiner*—Terry Lee Melius
*Assistant Examiner*—Heather Chun Shackelford
*Attorney, Agent, or Firm*—W. Scott Carson

[57] ABSTRACT

A pipe fitting for a flexible pipe such as used in lawn sprinkler systems. The fitting includes a pipe sealing portion and a pipe gripping portion. The pipe sealing portion has a smooth, seamless cylindrical surface to form a strong, watertight seal with the inner surface of the pipe. The pipe gripping portion is spaced from the sealing portion and includes a cylindrical surface with two rows of spikes extending axially along it. The rows are spaced 180 degrees from each other about the cylindrical surface and the cylindrical surface of the gripping portion has a smaller diameter than the cylindrical surface of the sealing portion. In use, the flexible pipe is forced to assume a substantially elliptical shape as it passes over the rows of progressively taller spikes. The pipe can then be crimped if desired to embed the spikes into the wall of the pipe and preferably to drive at least some of the spikes completely through the pipe wall.

42 Claims, 5 Drawing Sheets

PIPE FITTING

BACKGROUND OF THE INVENTION

1. Field of the Invention

The present invention relates to the field of pipe fittings or couplings for use with flexible pipes such as polyethylene ones commonly used in lawn sprinkler systems.

2. Discussion of the Background

Most commercially available pipe fittings for lawn sprinkler systems have a series of frusto-conical members or skirts. In use, these frusto-conical members are intended to perform both sealing and gripping functions (i.e., they are intended not only to prevent water from passing or leaking between them and the pipe but also to hold the pipe on the fitting under the force of the water pressure). Commonly, the pipe is crimped to actually embed or impale the edges or bases of the frusto-conical members into the plastic pipe. The problem with such dual functioning arrangements (i.e., sealing and gripping) is that they are a compromise and nearly always require exterior hose clamps to be effective, which can nearly double the material and labor costs and increase the time of installation.

That is, to get the frusto-conical members to provide a good grip to prevent blow outs, the base edges of the frusto-conical members must be as sharp as possible but this then reduces the sealing area or contact area with the pipe. To increase the sealing or contact area, the base edges can be flattened somewhat but then they do not hold as well and it is very difficult to apply enough force to crimp or impale the edges into the pipe. In effect, the compromise is that the sharper the base edges are made, the better the grip but the worse the seal. Conversely, the flatter the edges are made, the better the seal but the worse the grip. Also, for the best grip, the base edges would ideally actually pierce or pass entirely through the pipe wall for the maximum hold. However, this is obviously not possible with the frusto-conical members as each circular base edge would end up cutting the pipe completely in two. Such sealing/gripping frusto-conical members additionally tend to unseat themselves in use. That is, a high pressure or surge tends to lift or expand the pipe outwardly and off of the frusto-conical members, breaking both the seal and the grip. This is why clamps are almost always required with these types of pipe fittings.

In this light, the present invention was developed. With it, a clampless pipe fitting is provided with both superior sealing and gripping characteristics.

SUMMARY OF THE INVENTION

This invention relates to a pipe fitting for a flexible pipe such as used in lawn sprinkler systems. The fitting includes a pipe sealing portion and a pipe gripping portion. The pipe sealing portion has a smooth, seamless cylindrical surface to form a strong, watertight seal with the inner surface of the pipe. The pipe gripping portion is spaced from the sealing portion and includes a cylindrical surface with two rows of spikes extending axially along it. The rows are spaced 180 degrees from each other about the cylindrical surface and the cylindrical surface of the gripping portion has a smaller diameter than the cylindrical surface of the sealing portion.

In use, the fitting is inserted into the flexible pipe with the pipe first passing over the sealing portion and then striking the first pair of spikes. The first pair of spikes extends outwardly more than the sealing portion and each succeeding pair of spikes extends outwardly progressively farther. In this manner, the flexible pipe is forced to assume a substantially elliptical shape as it passes over the rows of progressively taller spikes. The pipe can then be crimped if desired to embed the spikes into the wall of the pipe and preferably to drive at least some of the spikes completely through the pipe wall.

DETAILED DESCRIPTION OF THE PREFERRED EMBODIMENT

Figure 1:
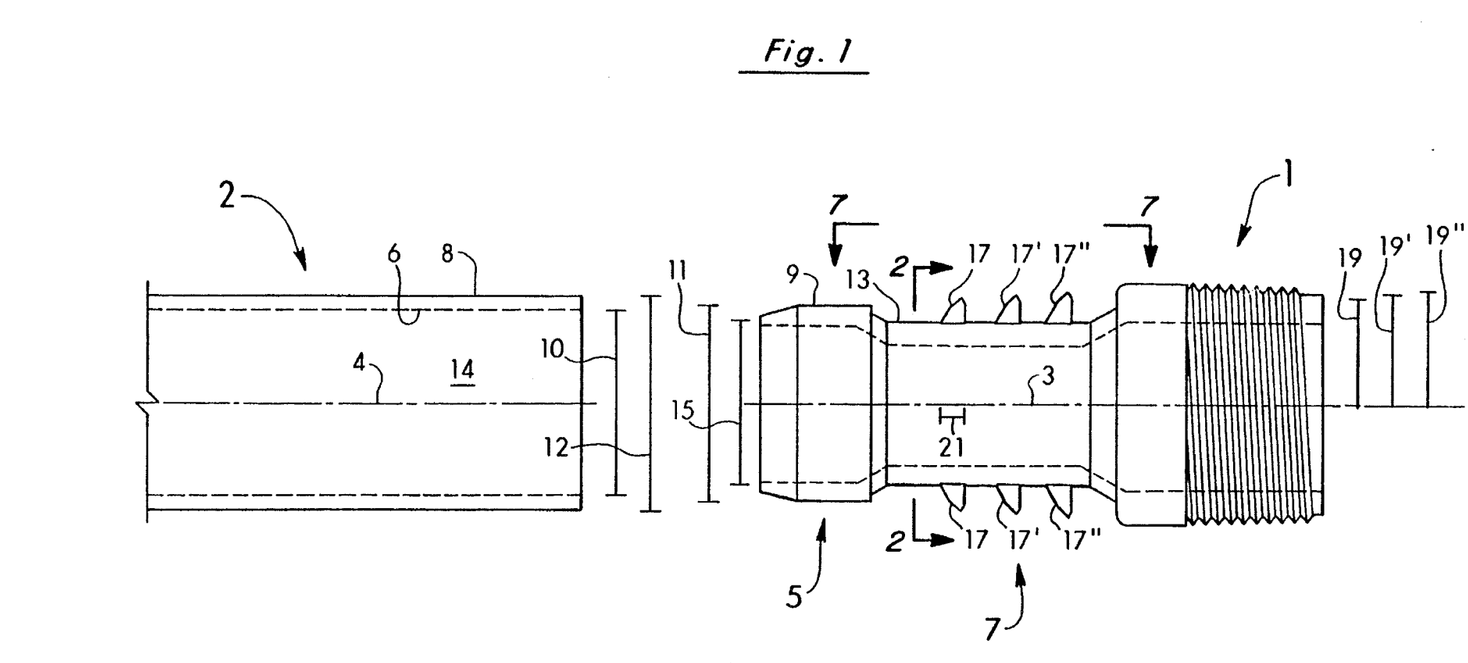
FIG. 1 illustrates the pipe fitting of the present invention adapted for use with a cylindrical pipe such as used in lawn sprinkler systems.

The pipe fitting 1 of the present invention is illustrated in FIG. 1 as adapted for use in combination with a flexible pipe 2. As shown, the flexible pipe 2 is substantially cylindrical about the axis 4 and has inner and outer surfaces 6 and 8 with respective inner and outer diameters 10 and 12. The flexible pipe 2 has at least one open end 14 and is preferably made out of polyethylene, rubber, or other flexible and resilient material.

The pipe fitting 1 as also illustrated in FIG. 1 extends along the axis 3 and has a pipe sealing portion 5 and a pipe gripping portion 7. The sealing portion 5 has a substantially cylindrical section with an outer, substantially smooth, cylindrical surface 9 extending about and along the axis 3. The outer cylindrical surface 9 preferably has a diameter 11 at least as large and preferably larger than the inner diameter 10 of the flexible pipe 2. The gripping portion 7 of the pipe fitting 1 as shown in FIG. 1 is spaced along the axis 3 from the sealing portion 5. As also shown, the gripping portion 7 has a substantially cylindrical section with an outer, substantially cylindrical surface 13 extending about and along the axis 3. The outer cylindrical surface 13 preferably has a diameter 15 that is less than the diameter 11 of the outer cylindrical surface 9 of the sealing portion 5 and less than the inner diameter 10 of the flexible pipe 2.

Figure 2:
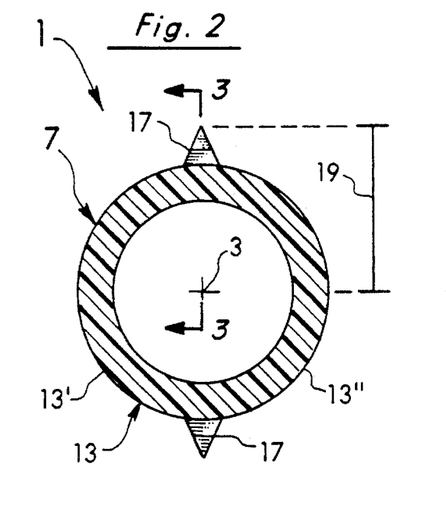
FIG. 2 is a simplified cross-sectional view of the pipe fitting taken along line 2—2 of FIG. 1 showing the first pair of spikes.

The gripping portion 7 of the fitting 1 includes pairs of spikes 17, 17', and 17" (see FIG. 1) which are located substantially 180 degrees apart from each other about the axis 3 (see FIG. 2). Referring again to FIG. 1, each of the two spikes 17 in the first pair extends outwardly of the axis 3 for a distance 19 which is greater than the distance the cylindrical sealing surface 9 extends outwardly of the axis 3. This distance 19 is also greater than half the inner diameter 10 of the flexible pipe 2. As also shown in FIG. 1, the two spikes 17 of the first pair are located along the axis 3 substantially at a common location 21 relative to the axis 3. Additionally, as best seen in FIG. 2, the cylindrical surface 13 of the gripping portion 7 is substantially smooth and uninterrupted at 13' and 13" on each side about the axis 3 between the two spikes 17 of the first pair. In the preferred embodiment, the bases of the spikes 17 extend about 10 degrees about the axis 3 on the surface 13 (see FIG. 2) and the smooth portions 13' and 13" of the cylindrical surface 13 then extend respectively about 170 degrees in each direction about the axis 3 between the spikes 17. Each pair of spikes 17, 17', and 17" as shown in FIG. 1 extends outwardly of the axis 3 for progressively increasing distances 19, 19' and 19" (i.e., each pair of spikes is progressively taller).

Figure 4:
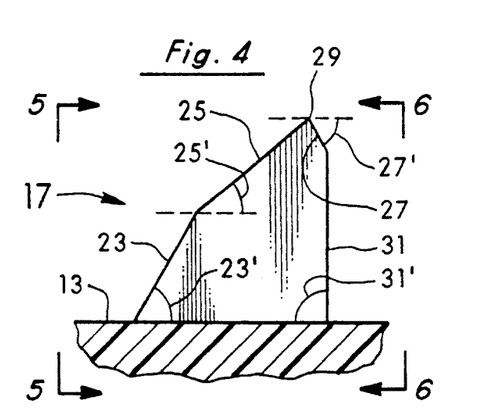
FIG. 4 is a further enlarged view of the first spike of the gripping portion.
Figure 5:
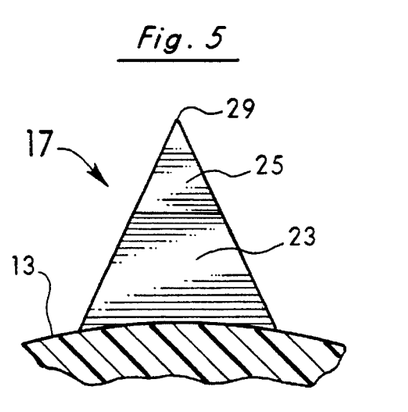
FIG. 5 is a view taken along line 5—5 of FIG. 4.
Figure 6:
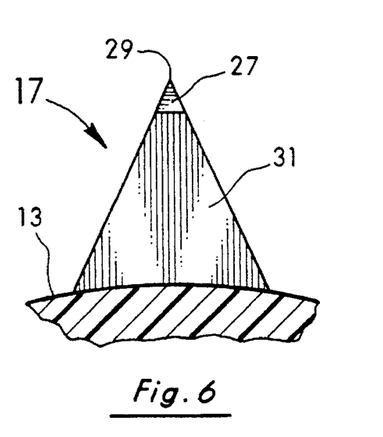
FIG. 6 is a view taken along line 6—6 of FIG. 4.

Although the spikes 17, 17', and 17" have differing heights, the spikes preferably have substantially the same unique shape as illustrated in FIGS. 4–6. As shown in FIGS. 4–6 in reference to the first spike 17, each spike preferably has a first face 23 extending at a first inclined angle 23' (e.g., 60 degrees) outwardly of the cylindrical surface 13 in the direction of the axis 3. Additionally, each spike has a second face 25 extending from the first face 23 at a second inclined angle 25' (e.g., 40–45 degrees) outwardly of the cylindrical surface 13 in the direction of the axis 3. As shown and in the preferred embodiment, the first inclined angle 23' is preferably greater than the second inclined angle 25'. Additionally, as shown, these first and second faces 23 and 25 are preferably both planar ones with the face 23 (see FIG. 5) having a truncated triangular shape and the second face 25 having a triangular shape. Each of the spikes additionally includes a third face 27 (see FIG. 4) forming an apex 29 with the second face 25. The third face 27 extends at a third inclined angle 27' (e.g., 60 degrees) downwardly or inwardly from the apex 29 toward the cylindrical surface 13 in the direction of the axis 3. The third inclined angle 27' is preferably greater than the second inclined angle 25'. The third face 27 preferably meets a fourth face 31 that extends upwardly from the cylindrical surface 13 at a substantially right angle 31'. The third face 27 (see FIG. 6) is preferably planar with a triangular shape and the fourth face 31 is also preferably planar with a truncated triangular shape. The purpose of the steeper face 23 versus making face 23 a continuation of face 25 is to provide more area between successive spikes 17, 17', and 17" for better crimping as explained in more detail below. The purpose of having face 27 not be a continuation of face 31 is so the apex is not so sharp and so thin (i.e., weak) that it will roll over when inserted into the pipe 2.

Figure 3:
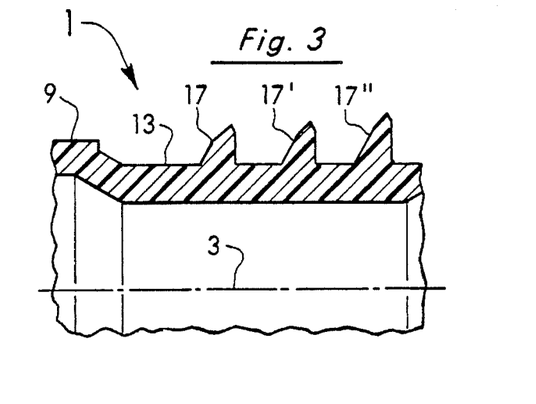
FIG. 3 is an enlarged view of the spikes of the gripping portion of the fitting taken along line 3—3 of FIG. 2.
Figure 7:
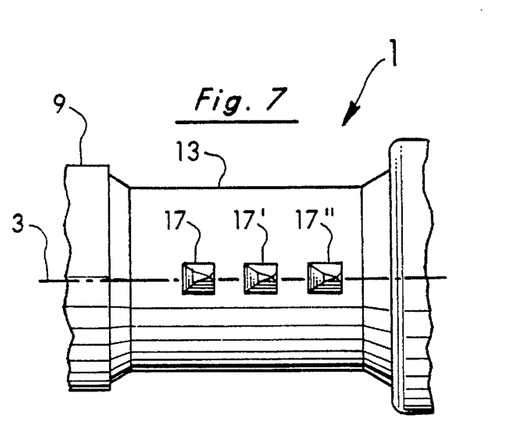
FIG. 7 is a view taken along line 7—7 of FIG. 1.

The corresponding spikes 17, 17', and 17" in each pair of spikes (see FIG. 1) are preferably aligned in a direction (see the plan view of FIG. 7) along the axis 3 and extend in respective rows away from the sealing portion 5 (see again FIG. 1) As discussed above, the spikes 17, 17', and 17" in each of the pairs extend outwardly of the axis 3 progressively farther (see 19, 19', and 19" in FIG. 1). Also, as best seen in FIGS. 1 and 3, the spikes 17 of the first pair are spaced farther from the sealing surface 9 along the axis 3 than the spikes 17 are spaced from the spikes 17' of the second pair.

Figure 8:
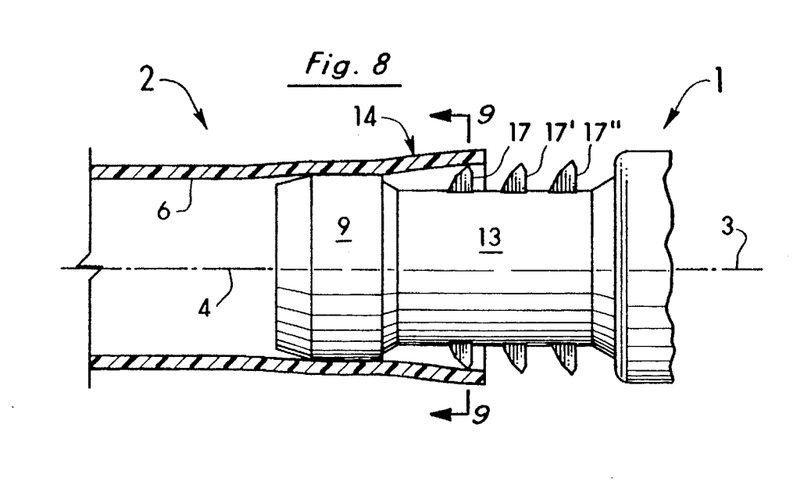
FIG. 8 is a cross-sectional view of the pipe fitting of the present invention as it is being initially inserted into the pipe.
Figure 9:
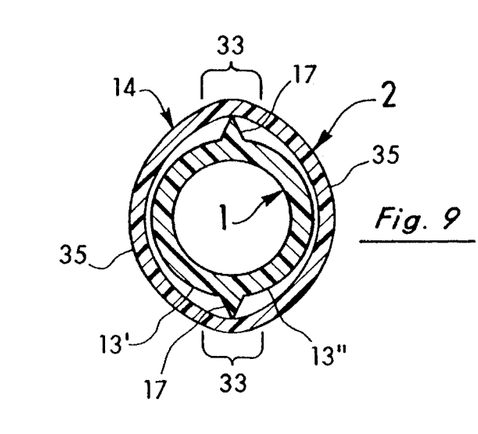
FIG. 9 is a view taken along line 9—9 of FIG. 8.
Figure 10:
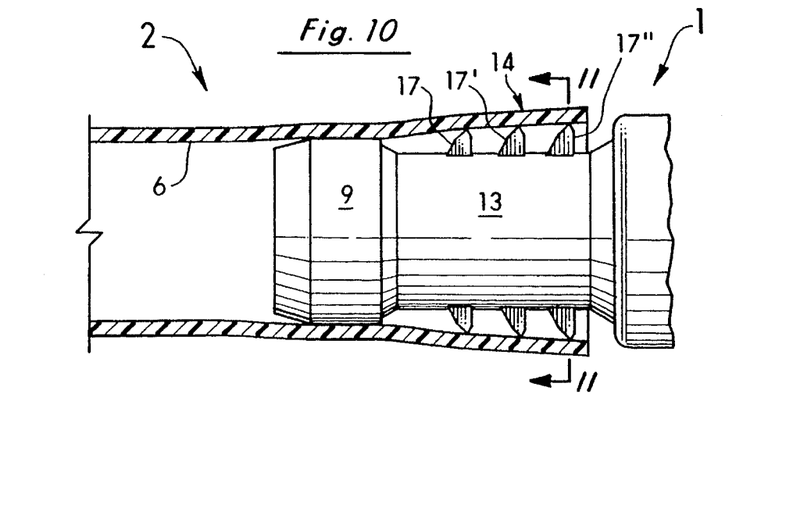
FIG. 10 is a cross-sectional view of the pipe fitting as it is being further inserted into the pipe.
Figure 11:
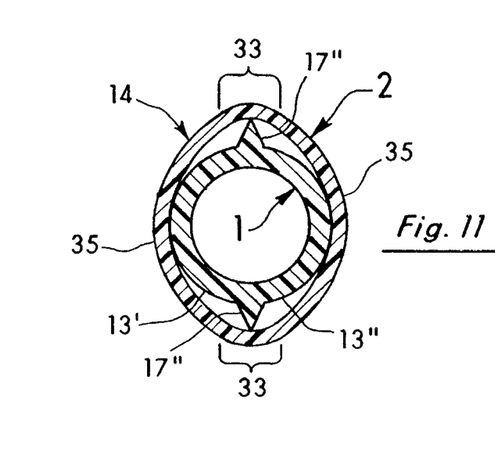
FIG. 11 is a view taken along line 11—11 of FIG. 10.
Figure 12:
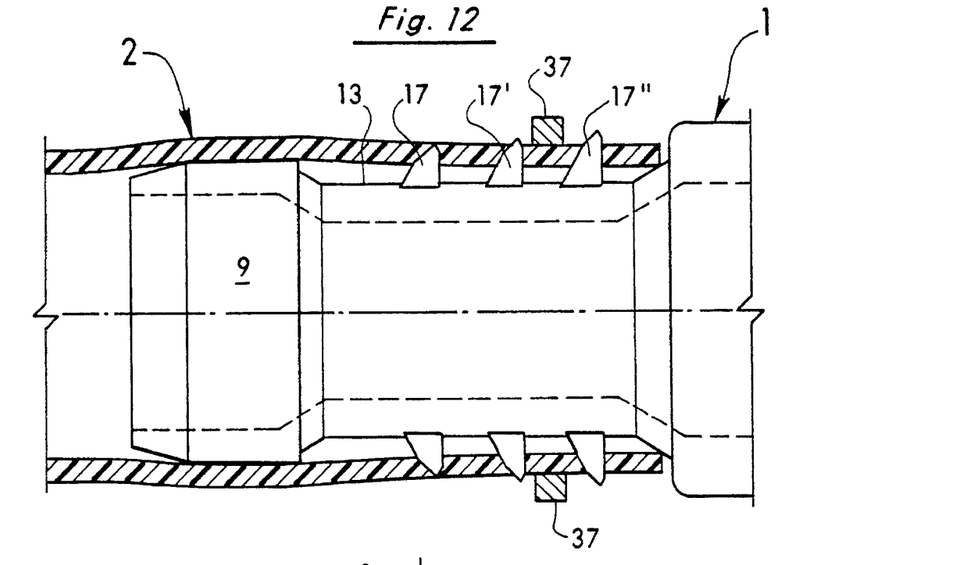
FIG. 12 is a view similar to FIG. 10 showing the pipe being crimped on the fitting to embed or impale the spikes of the fitting into the pipe walls.

In operation as illustrated in FIGS. 8–12, the pipe fitting 1 is inserted into the open end 14 of the flexible pipe 2 with the respective axes 3 and 4 aligned to be substantially colinear (see FIG. 8). The open end 14 of the pipe 2 then rides over the cylindrical sealing surface 9 and contacts and rides up and over the spikes 17 of the first pair (see FIG. 8). In doing so, the pipe 2 adjacent its open end 14 is caused to assume a substantially elliptical shape (see FIG. 9). This is caused not only because the spikes 17 extend outwardly farther than the cylindrical sealing surface 9 but also because the cylindrical surface 13 at 13' and 13" is smooth and uninterrupted about the axis 3 between the spikes 17 (see FIG. 9) and is of a smaller diameter than the sealing surface 9 (see FIG. 8). That is, as the open end 14 of the pipe 2 hits the spikes 17 of the first pair, the longitudinal sections 33 of the pipe 2 that strike and ride up and over the spikes 17 (see FIG. 9) are forced outwardly of the axis 3. In doing so, the pipe 2 is moved toward a substantially elliptical shape with the longitudinal segments 33 of the pipe 2 respectively moving outwardly of the axis 3. At the same time, the remaining longitudinal or side segments 35 (see FIG. 9) of the pipe 2 are respectively allowed to move inwardly toward the axis 3 and toward sections 13' and 13" of the cylindrical surface 13 (which is of a reduced diameter smaller than the diameter of the sealing surface 9). As the fitting 2 is pushed farther into the pipe 2 (see FIG. 10), the open end 14 of the pipe 2 is further elongated into a flatter or higher eccentricity ellipse (see FIG. 11). In doing so, the major or longitudinal axis of the ellipse becomes progressively larger relative to the minor or side-to-side axis (compare FIGS. 9 and 11).

In this manner, as the pipe 2 is pushed farther onto the fitting 2 (see FIGS. 8–11), the pipe 2 contacts the progressively taller spikes 17, 17', and 17". In doing so, the pipe 2 is forced to change from the cylindrical shape it assumes passing over the cylindrical sealing surface 9 to progressively flatter or more eccentric ellipses (i.e., increasing major to minor axes ratio) as the pipe 2 reaches the third pair of spikes 17" (see FIG. 11). To facilitate this flattening of the pipe 2, the spikes 17 of the first pair are the shortest ones and are spaced farther (e.g., about twice the distance) from the cylindrical sealing surface 9 along the axis 3 than the spikes 17 are spaced from the spikes 17' of the second pair. Because the spikes 17 of the first pair are the shortest and because of this extra distance, the flexible pipe 2 can more easily go from the cylindrical shape at the sealing surface 9 to the first elliptical shape at the spikes 17 and then the progressively more elliptical or flatter shapes at spikes 17' and 17". In doing so, the inner circumference of the inner surface 6 of the pipe 2 remains substantially the same. At that point, the flexible and resilient pipe 2 can be left as is or preferably allowed to contractually creep inwardly on the spikes 17, 17', and 17" to embed the spikes into the wall of the flexible pipe. More preferably, the spikes are embedded or impaled on the pipe 2 to actually extend through the pipe wall (see FIG. 12) by the contractual creep of the resilient pipe 2 over time (e.g., 24 hours) or by mechanically crimping the pipe with a crimping tool 37 (e.g., pliers).

Because the pipe 2 is caused to assume an elliptical shape (with the longitudinal segments 33 moving outwardly in FIG. 11 and the remaining or side segments 35 moving inwardly toward the reduced diameter surface 13), the maximum height of the spikes 17" can be increased over fittings with spikes extending all about the axis 3. In other words, if the spikes were all about or uniformly about the axis 3 instead of in only two opposing rows, the pipe 2 would maintain its circular shape. Consequently, the maximum height of the spikes (and subsequent ability to be impaled on the pipe wall) would be reduced. However, with only two rows of spikes 180 degrees apart (versus for example four rows at 90 degrees apart) and with the resulting ellipsing of the pipe, the spikes can then be that much taller (e.g., twice). This additional height provides a better grip after crimping or after the pipe contractually creeps. In this regard, the depth of the embedding or impaling of the spikes in most cases is actually more important for a good grip than the number of embedded spikes. It also reduces the need for any extra and expensive clamps, particularly where it is possible to give the spikes sufficient height to actually pass through the pipe wall.

As discussed above, the sealing surface 9 of the sealing portion 5 is preferably a smooth, seamless, cylindrical surface so that it can form a complete and watertight seal with the inner surface 6 of the flexible pipe 2. In contrast, many conventional fittings are formed or molded of two or more parts and have longitudinal seams that can create irregularities in the sealing surface. Such irregularities may be the result of misaligned halves, protuberances extending outwardly of the cylindrical surface at the joint lines, or recesses extending inwardly of the cylindrical sealing surface. Regardless of the cause, such irregularities from joining two or more parts destroy the smoothness of the sealing surface. They also destroy the perfect fit between the cylindrical sealing surface and the inner cylindrical surface 6 of the flexible pipe 2 by creating flashes or channels when the parts are joined through which water can flow. This results in a weaker seal and/or a fitting that requires a clamp be used to force the pipe into the voids or irregular areas created by the seams. Also, the long sealing surface 9 of the present invention is relatively unaffected by higher operating pressures and surge pressures. Even abnormally high pressures can only expand the front end of the seal between the sealing surface 9 and pipe 2 leaving the back end of the seal intact.

Figure 13:
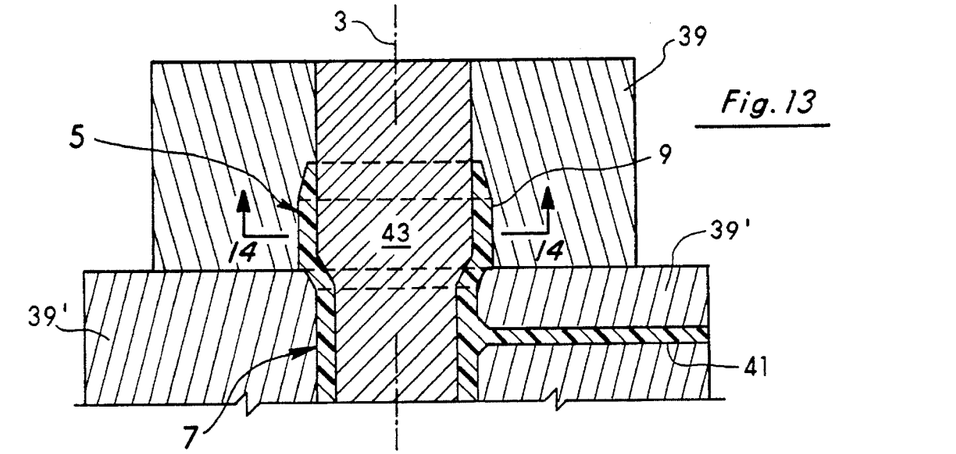
FIG. 13 schematically illustrates a molding technique to create a seamless sealing surface on the fitting.
Figure 14:
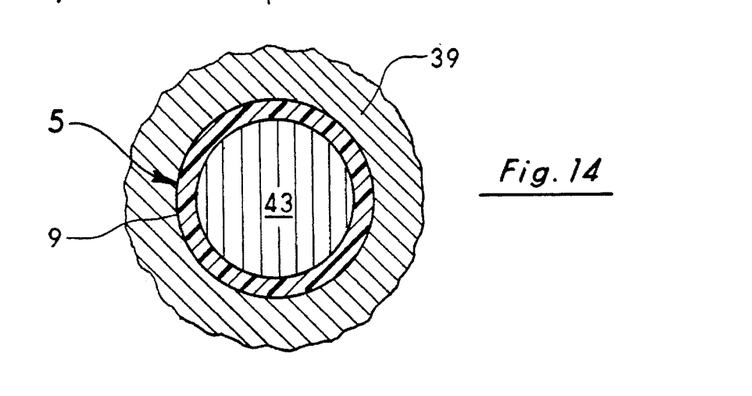
FIG. 14 is a view taken along line 14—14 of FIG. 13.

In creating the seamless, cylindrical surface 9 of the present invention, a molding technique such as the one illustrated in FIGS. 13 and 14 can be used. As illustrated in FIG. 13, the molding block 39 for the sealing portion 5 of the fitting 1 is continuous about the axis 3 (versus, for example, the two or multi-piece 39' mold for the gripping portion 7). In use, plastic (e.g., PVC or other relatively hard material in comparison to the flexible pipe material) is injected through the feed channel 41 and enters the area 5 about the core 43. The plastic material in the area 5 then hardens and the one-piece molding block 39 for the sealing portion 5 (see FIGS. 13 and 14) can be lifted upwardly from the position of FIG. 13 creating the smooth, seamless, cylindrical sealing surface 9.

Figure 15:
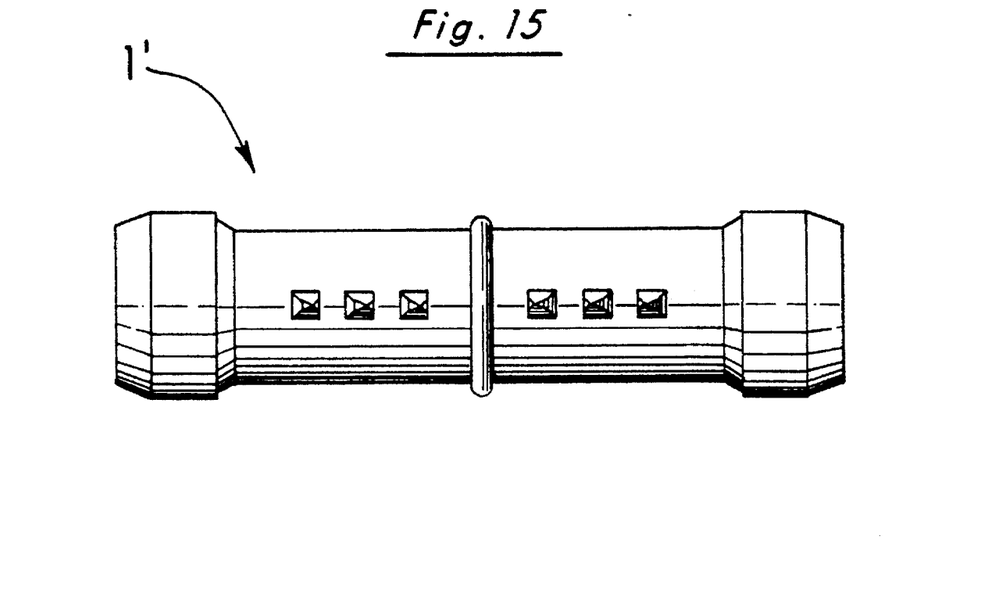
FIG. 15 illustrates the present invention adapted on a straight or mirror fitting.
Figure 16:
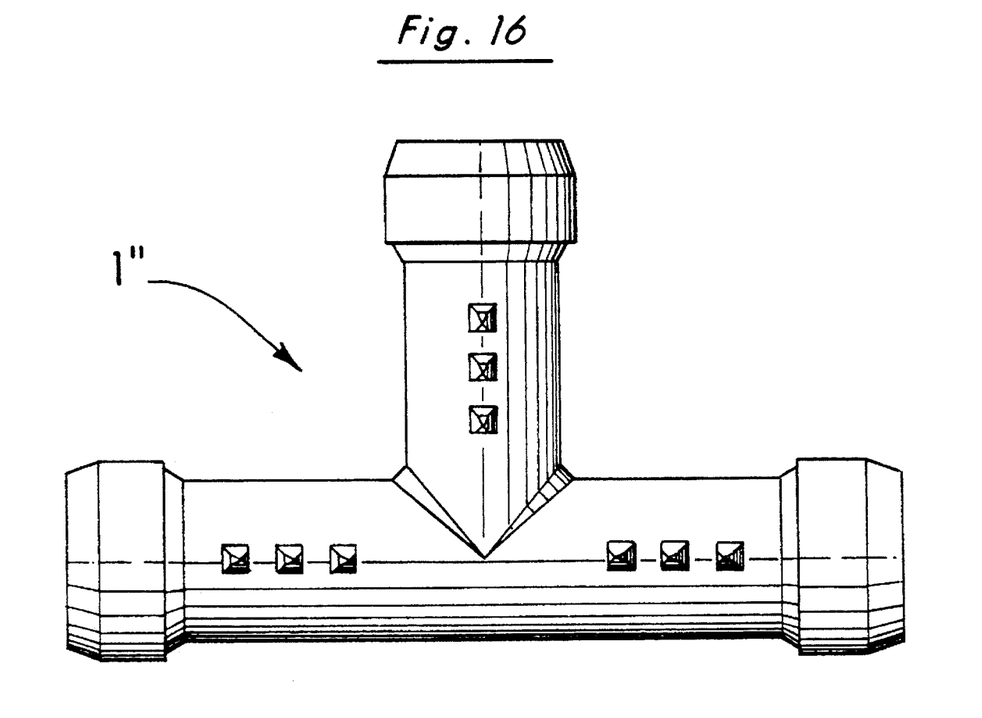
FIG. 16 illustrates the present invention adapted on a Tee fitting.

While several embodiments of the present invention have been shown and described in detail, it is to be understood that various changes and modifications could be made without departing from the scope of the invention. For example, the pipe fitting 1 of the present invention has been primarily shown in use in a fitting with a threaded end for use with a threaded valve. However, the fitting can easily be adapted for use in any number of fittings such as the straight or mirror fitting 1' of FIG. 15 and the Tee fitting 1" of FIG. 16. Additionally, the pipe fitting of FIGS. 1–14 has been illustrated with three pairs of spikes and a one inch pipe but it is equally adaptable for use with smaller or larger pipes and can have fewer or more pairs of spikes. The relative dimensions of the fitting 1 can also be varied but, for example, with a one inch pipe with a 1.049 inch inner diameter and 0.080 inch wall thickness, the diameters 11 and 15 of the pipe fitting surfaces 9 and 13 would be about 1.085 inches and 0.900 inches respectively. For reference purposes, the heights of the progressively taller spikes 17, 17', and 17" above the cylindrical surface 13 would be about 0.150, 0.167, and 0.185 inches (e.g., preferably each spike is taller than the wall thickness of the pipe) and the entire length of the illustrated fitting 1 would be about 3 inches.

I claim:

1. A pipe fitting and flexible pipe combination:

said flexible pipe being substantially cylindrical about a first axis and having inner and outer surfaces with respective inner and outer diameters and further having at least one open end and said pipe fitting extending along a second axis and having a pipe sealing portion and a pipe gripping portion, said sealing portion having a substantially cylindrical section with an outer, substantially smooth, cylindrical surface extending about and along said second axis, said outer cylindrical surface having a diameter at least as large as the inner diameter of said flexible pipe, said gripping portion being spaced along said second axis from said sealing portion and having a substantially cylindrical section with an outer, substantially cylindrical surface extending about and along said second axis, said outer cylindrical surface of said gripping portion having a diameter less than the diameter of the outer cylindrical surface of said sealing portion and less than the inner diameter of said flexible pipe, said gripping portion further including a first pair of spikes, said spikes being located substantially 180 degrees apart from each other about said second axis and extending outwardly from the cylindrical surface of said gripping portion, each of said spikes extending outwardly of said second axis for a distance greater than said cylindrical surface of said sealing portion extends outwardly of said second axis and greater than half the inner diameter of said flexible pipe, said spikes being located along said second axis substantially at a common location relative to said second axis, said cylindrical surface of said gripping portion being substantially smooth and uninterrupted about said second axis between said spikes, said cylindrical sections of said sealing and gripping portions having respective inner, substantially cylindrical surfaces extending about and along said second axis, said inner cylindrical surface of the cylindrical section of said sealing portion having a diameter greater than the diameter of the inner cylindrical surface of the cylindrical section of the gripping portion.

2. The combination of claim 1 wherein the diameter of the outer cylindrical surface of said sealing portion is greater than the inner diameter of said flexible pipe.

3. The combination of claim 1 wherein said spike extends outwardly from said outer cylindrical surface of said gripping portion for a distance greater than the difference between the inner and outer diameters of said flexible pipe wherein said flexible pipe can be impaled on said spikes with said spikes extending through said flexible pipe.

4. The combination of claim 1 wherein said outer cylindrical surface of said sealing portion is seamless.

5. The combination of claim 1 wherein said pipe sealing portion and said pipe gripping portion are insertable into the open end of said flexible pipe with said first and second axes aligned to be substantially colinear wherein said pipe gripping portion includes means for causing said flexible pipe to assume a substantially elliptical shape about said colinear first and second axes as said pipe gripping portion is inserted into said flexible pipe.

6. A pipe fitting and flexible pipe combination:

said flexible pipe being substantially cylindrical about a first axis and having inner and outer surfaces with respective inner and outer diameters and further having at least one open end and said pipe fitting extending along a second axis and having a pipe sealing portion and a pipe gripping portion, said sealing portion having a substantially cylindrical section with an outer, substantially smooth, cylindrical surface extending about and along said second axis, said outer cylindrical surface having a diameter at least as large as the inner diameter of said flexible pipe, said gripping portion being spaced along said second axis from said sealing portion and having a substantially cylindrical section with an outer, substantially cylindrical surface extending about and along said second axis, said outer cylindrical surface of said gripping portion having a diameter less than the diameter of the outer cylindrical surface of said sealing portion and less than the inner diameter of said flexible pipe, said gripping portion further including a first pair of spikes, said spikes being located substantially 180 degrees apart from each other about said second axis and extending outwardly from the cylindrical surface of said gripping portion, each of said spikes extending outwardly of said second axis for a distance greater than said cylindrical surface of said sealing portion extends outwardly of said second axis and greater than half the inner diameter of said flexible pipe, said spikes being located along said second axis substantially at a common location relative to said second axis, said cylindrical surface of said gripping portion being substantially smooth and uninterrupted about said second axis between said spikes wherein each of said spikes extends in a direction along said second axis away from sealing portion and has a first face extending at a first inclined angle outwardly of said cylindrical surface of said gripping portion in the direction of said second axis and has a second face extending therefrom at a second inclined angle outwardly of said cylindrical surface of said gripping portion in the direction of said second axis, said first inclined angle being greater than said second inclined angle.

7. The combination of claim 6 wherein said first inclined angle is about 60 degrees.

8. The combination of claim 7 wherein said second inclined angle is about 40 to about 45 degrees.

9. The combination of claim 6 wherein said first face is planar and has a truncated triangular shape.

10. The combination of claim 9 wherein said second face is planar and has a triangular shape.

11. The combination of claim 6 wherein each of said spikes has a third face forming an apex with said second face and extending at a third inclined angle inwardly from said apex toward said cylindrical surface of said gripping portion in the direction of said second axis.

12. The combination of claim 1 wherein said third inclined angle is greater than said second inclined angle.

13. The combination of claim 11 wherein said third inclined angle is about 60 degrees.

14. The combination of claim 11 wherein said third face is planar and has a triangular shape.

15. The combination of claim 11 wherein each spike has a fourth face extending from said third face to said cylindrical surface of said gripping portion.

16. The combination of claim 15 wherein said fourth face is planar and has a truncated triangular shape.

17. The combination of claim 15 wherein said fourth face extends outwardly of said cylindrical surface of said gripping portion at substantially 90 degrees.

18. A pipe fitting and flexible pipe combination:

said flexible pipe being substantially cylindrical about a first axis and having inner and outer surfaces with respective inner and outer diameters and further having at least one open end and said pipe fitting extending along a second axis and having a pipe sealing portion and a pipe gripping portion, said sealing portion having a substantially cylindrical section with an outer, substantially smooth, cylindrical surface extending about and along said second axis, said outer cylindrical surface having a diameter at least as large as the inner diameter of said flexible pipe, said gripping portion being spaced along said second axis from said sealing portion and having a substantially cylindrical section with an outer, substantially cylindrical surface extending about and along said second axis, said outer cylindrical surface of said gripping portion having a diameter less than the diameter of the outer cylindrical surface of said sealing portion and less than the inner diameter of said flexible pipe, said gripping portion further including a first pair of spikes, said spikes being located substantially 180 degrees apart from each other about said second axis and extending outwardly from the cylindrical surface of said gripping portion, each of said spikes extending outwardly of said second axis for a distance greater than said cylindrical surface of said sealing portion extends outwardly of said second axis and greater than half the inner diameter of said flexible pipe, said spikes being located along said second axis substantially at a common location relative to said second axis, said cylindrical surface of said gripping portion being substantially smooth and uninterrupted about said second axis between said spikes, said pipe fitting further including a second pair of spikes, each spike of said second pair being substantially aligned with a corresponding spike of said first pair in a direction along said second axis away from said sealing portion and extending outwardly of said second axis for a distance greater than the corresponding spike of the first pair.

19. The combination of claim 18 wherein each spike of said first pair is spaced farther from the sealing portion than each said spike is spaced from the corresponding spike of said second pair.

20. The combination of claim 18 wherein each spike of said second pair extends outwardly from said cylindrical surface of said gripping portion for a distance greater than the difference between the inner and outer diameters of said flexible pipe wherein said flexible pipe can be impaled on said spikes of said second pair with said spikes extending through said flexible pipe.

21. A pipe fitting and flexible pipe combination:

said flexible pipe being substantially cylindrical about a first axis and having inner and outer surfaces with respective inner and outer diameters and further having at least one open end and said pipe fitting extending along a second axis and having a pipe sealing portion and a pipe gripping portion, said pipe sealing portion having a sealing surface extending about said second axis at a radial distance at least as large as half the inner diameter of said flexible pipe, said pipe sealing portion and said pipe gripping portion being insertable into the open end of said flexible pipe with said first and second axes aligned to be substantially colinear wherein said pipe gripping portion includes means for causing said flexible pipe to assume a substantially elliptical shape about said colinear first and second axes as said pipe gripping portion is inserted into said flexible pipe wherein said means for causing said flexible pipe to assume said substantially elliptical shape about said colinear first and second axes as said pipe gripping portion is inserted into said flexible pipe includes a first pair of spikes, said spikes being located substantially 180 degrees apart from each other about said second axis and respectively extending outwardly of said second axis for a distance greater than the distance said sealing surface of said pipe sealing portion extends outwardly of said second axis and greater than half the inner diameter of said flexible pipe.

22. The combination of claim 21 wherein said sealing surface of said pipe sealing portion extends about said second axis at a radial distance greater than half the inner diameter of said flexible pipe.

23. The combination of claim 21 wherein said sealing surface of said pipe sealing portion extends about said second axis at a substantially uniform distance.

24. The combination of claim 23 wherein said uniform distance is greater than half the inner diameter of said flexible pipe.

25. The combination of claim 21 wherein said sealing surface of said pipe sealing portion of said pipe fitting sealingly engages the inner surface of said flexible pipe completely about said colinear first and second axes.

26. The combination of claim 21 wherein said sealing surface of said pipe sealing portion is a substantially smooth, cylindrical surface extending about and along said second axis.

27. The combination of claim 26 wherein said cylindrical sealing surface extends about said second axis at a radial distance greater than half the inner diameter of said flexible pipe.

28. The combination of claim 26 wherein said cylindrical surface of said pipe sealing portion is seamless.

29. The combination of claim 21 wherein said spikes are located along said second axis substantially at a common location relative to said second axis.

30. The combination of claim 21 wherein said means for causing said flexible pipe to assume said elliptical shape further includes a second pair of spikes located substantially 180 degrees apart from each other about said second axis, the corresponding spikes in each pair of spikes being aligned with each other along said second axis.

31. The combination of claim 30 wherein each of said spikes of said second pair extends outwardly of said second axis farther than the corresponding spike of the first pair.

32. The combination of claim 31 wherein said second pair of spikes is located along said second axis farther from said pipe sealing portion of said pipe fitting than said first pair.

33. The combination of claim 32 wherein each spike of said first pair is spaced farther from the pipe sealing portion than each said spike is spaced from the corresponding spike of said second pair.

34. The combination of claim 28 wherein said pipe gripping portion is spaced along said second axis from said pipe sealing portion.

35. The combination of claim 34 wherein said pipe gripping portion has a substantially cylindrical section with an outer, substantially cylindrical surface extending about and along said second axis at a radial distance less than the radial distance the sealing surface of said pipe sealing portion is spaced from said second axis and less than half the inner diameter of said flexible pipe, said spikes being located on said cylindrical surface and extending outwardly therefrom.

36. A pipe fitting and flexible pipe combination:

said flexible pipe being substantially cylindrical about a first axis and having inner and outer surfaces with respective inner and outer diameters and further having at least one open end and said pipe fitting extending along a second axis and having a pipe sealing portion and a pipe gripping portion, said pipe sealing portion having a sealing surface extending about said second axis at a radial distance at least as large as half the inner diameter of said flexible pipe, said pipe sealing portion and said pipe gripping portion being insertable into the open end of said flexible pipe with said first and second axes aligned to be substantially colinear wherein said pipe gripping portion includes means for causing said flexible pipe to assume a substantially elliptical shape about said colinear first and second axes as said pipe gripping portion is inserted into said flexible pipe wherein said means for causing said flexible pipe to assume said elliptical shape about said colinear first and second axes as said pipe gripping portion is inserted into said flexible pipe further including means for increasing the eccentricity of the elliptical shape of said flexible pipe at the open end thereof as the pipe gripping portion is inserted farther into said flexible pipe.

37. The combination of claim 36 wherein said eccentricity increasing means includes first and second pairs of spikes, said first pair of spikes being located substantially 180 degrees apart from each other about said second axis and respectively extending outwardly of said second axis for a distance greater than the distance said sealing surface of said pipe sealing portion extends outwardly of said second axis and greater than half the inner diameter of said flexible pipe, said second pair of spikes being located substantially 180 degrees apart from each other about said second axis, each spike of said second pair being substantially aligned with a corresponding spike of said first pair in a direction along said second axis, each spike of said second pair extending outwardly of said second axis for a distance greater than the corresponding spike of the first pair.

38. A method for sealing and gripping a pipe fitting in a flexible pipe, said method including the steps of:

(a) providing a substantially cylindrical, flexible and resilient pipe extending along a first axis and having inner and outer surfaces with respective inner and outer diameters and further having an open end, (b) providing a pipe fitting extending along a second axis and having a pipe sealing portion and a pipe gripping portion, said pipe sealing portion having a sealing surface extending about said second axis at a radial distance at least as large as half the inner diameter of said flexible pipe, said pipe gripping portion being spaced along said second axis from said pipe sealing portion and having a substantially cylindrical section with an outer, substantially cylindrical surface extending about and along said second axis at a radial distance less than the radial distance the sealing surface of said pipe sealing portion is spaced from the second axis and less than half the inner diameter of said flexible pipe said pipe gripping portion further having a first pair of spikes located on said outer cylindrical surface and spaced substantially 180 degrees apart from each other about said second axis and respectively extending outwardly of said second axis for a distance greater than the distance said sealing surface of said pipe sealing portion extends outwardly of said second axis and greater than half the inner diameter of said flexible pipe, (c) inserting said pipe sealing portion and said pipe gripping portion of said pipe fitting into the open end of said flexible pipe, (d) allowing the flexible pipe to assume a substantially elliptical shape by permitting first and second longitudinal segments of the flexible pipe to respectively contact and ride up over said spikes and outwardly of said second axis and permitting the remaining longitudinal segments of said flexible pipe to move inwardly toward said second axis and toward the outer cylindrical surface of said pipe gripping portion, and (e) crimping said flexible pipe to embed said spikes into said flexible pipe.

39. The method of claim 38 further including the step of making said sealing surface of said pipe sealing portion a smooth, seamless, cylindrical surface.

40. A method for sealing and gripping a pipe fitting in a flexible pipe, said method including the steps of:

(a) providing a substantially cylindrical, flexible and resilient pipe extending along a first axis and having inner and outer surfaces with respective inner and outer diameters and further having an open end, (b) providing a pipe fitting extending along a second axis and having a pipe sealing portion and a pipe gripping portion, said pipe sealing portion having a sealing surface extending about said second axis at a radial distance at least as large as half the inner diameter of said flexible pipe, said pipe gripping portion being spaced along said second axis from said pipe sealing portion and having a substantially cylindrical section with an outer, substantially cylindrical surface extending about and along said second axis at a radial distance less than the radial distance the sealing surface of said pipe sealing portion is spaced from the second axis and less than half the inner diameter of said flexible pipe, said pipe gripping portion further having a first pair of spikes located on said outer cylindrical surface and spaced substantially 180 degrees apart from each other about said second axis and respectively extending outwardly of said second axis for a distance greater than the distance said sealing surface of said pipe sealing portion extends outwardly of said second axis and greater than half the inner diameter of said flexible pipe, said spikes further extending outwardly of said cylindrical surface of said pipe gripping portion for a distance greater than the distance between the inner and outer diameters of said flexible pipe, (c) inserting said pipe sealing portion and said pipe gripping portion of said pipe fitting into the open end of said flexible pipe, (d) allowing the flexible pipe to assume a substantially elliptical shape by permitting first and second longitudinal segments of the flexible pipe to respectively contact and ride up over said spikes and outwardly of said second axis and permitting the remaining longitudinal segments of said flexible pipe to move inwardly toward said second axis and toward the outer cylindrical surface of said pipe gripping portion, and (e) crimping said flexible pipe to drive said spikes through said flexible pipe.

41. A method for sealing and gripping a pipe fitting in a flexible pipe, said method including the steps of:

(a) providing a substantially cylindrical, flexible and resilient pipe extending along a first axis and having inner and outer surfaces with respective inner and outer diameters and further having an open end, (b) providing a pipe fitting extending along a second axis and having a pipe sealing portion and a pipe gripping portion, said pipe sealing portion having a sealing surface extending about said second axis at a radial distance at least as large as half the inner diameter of said flexible pipe, said pipe gripping portion being spaced along said second axis from said pipe sealing portion and having a substantially cylindrical section with an outer, substantially cylindrical surface extending about and along said second axis at a radial distance less than the radial distance the sealing surface of said pipe sealing portion is spaced from the second axis and less than half the inner diameter of said flexible pipe, said pipe gripping portion further having a first pair of spikes located on said outer cylindrical surface and spaced substantially 180 degrees apart from each other about said second axis and respectively extending outwardly of said second axis for a distance greater than the distance said sealing surface of said pipe sealing portion extends outwardly of said second axis and greater than half the inner diameter of said flexible pipe, (c) inserting said pipe sealing portion and said pipe gripping portion of said pipe fitting into the open end of said flexible pipe, (d) allowing the flexible pipe to assume a substantially elliptical shape by permitting first and second longitudinal segments of the flexible pipe to respectively contact and ride up over said spikes and outwardly of said second axis and permitting the remaining longitudinal segments of said flexible pipe to move inwardly toward said second axis and toward the outer cylindrical surface of said pipe gripping portion, and (e) allowing contractual creep of said flexible, resilient pipe inwardly at said spikes to embed said spikes into said flexible pipe.

42. A method for sealing and gripping a pipe fitting in a flexible pipe, said method including the steps of:

(a) providing a substantially cylindrical, flexible and resilient pipe extending along a first axis and having inner and outer surfaces with respective inner and outer diameters and further having an open end, (b) providing a pipe fitting extending along a second axis and having a pipe sealing portion and a pipe gripping portion, said pipe sealing portion having a sealing surface extending about said second axis at a radial distance at least as large as half the inner diameter of said flexible pipe, said pipe gripping portion being spaced along said second axis from said pipe sealing portion and having a substantially cylindrical section with an outer, substantially cylindrical surface extending about and along said second axis at a radial distance less than the radial distance the sealing surface of said pipe sealing portion is spaced from the second axis and less than half the inner diameter of said flexible pipe, said pipe gripping portion further having a first pair of spikes located on said outer cylindrical surface and spaced substantially 180 degrees apart from each other about said second axis and respectively extending outwardly of said second axis for a distance greater than the distance said sealing surface of said pipe sealing portion extends outwardly of said second axis and greater than half the inner diameter of said flexible pipe, (c) inserting said pipe sealing portion and said pipe gripping portion of said pipe fitting into the open end of said flexible pipe, (d) allowing the flexible pipe to assume a substantially elliptical shape by permitting first and second longitudinal segments of the flexible pipe to respectively contact and ride up over said spikes and outwardly of said second axis and permitting the remaining longitudinal segments of said flexible pipe to move inwardly toward said second axis and toward the outer cylindrical surface of said pipe gripping portion, and (e) increasing the eccentricity of said elliptical shape of said flexible pipe as said pipe fitting is inserted into said flexible pipe by providing a second pair of spikes aligned with said first pair along and about said second axis, each of said second pair of spikes extending outwardly of said second axis farther than the corresponding spike of the first pair.

* * * * *